May 2, 1961     J. F. STEWART     2,982,669
METHOD OF MAKING A PHOSPHOR SCREEN AND SCREEN PRODUCED THEREBY
Filed July 1, 1957
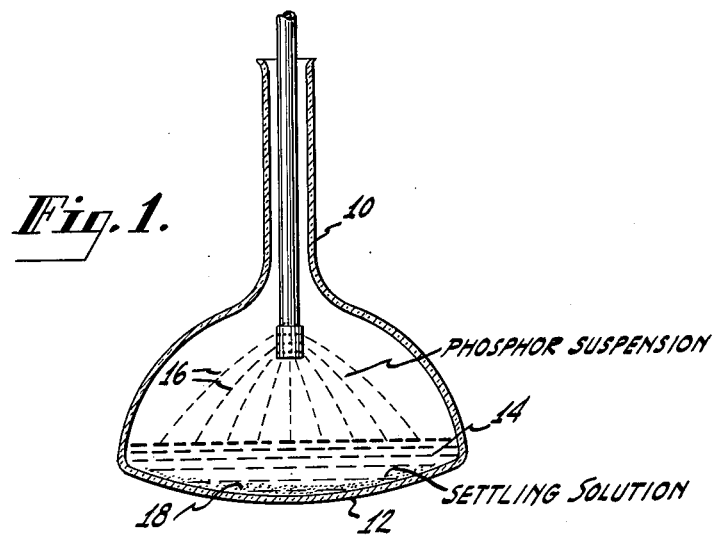
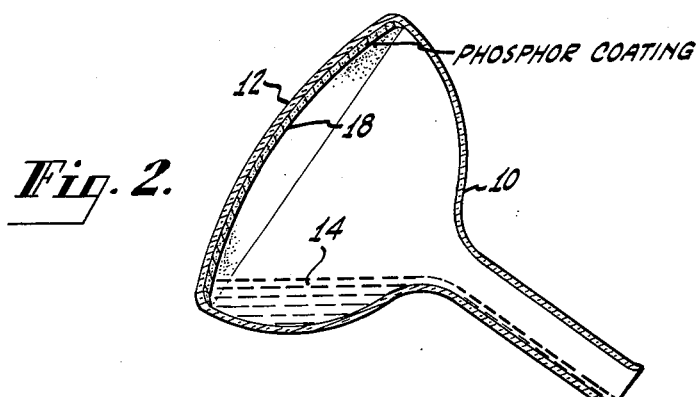
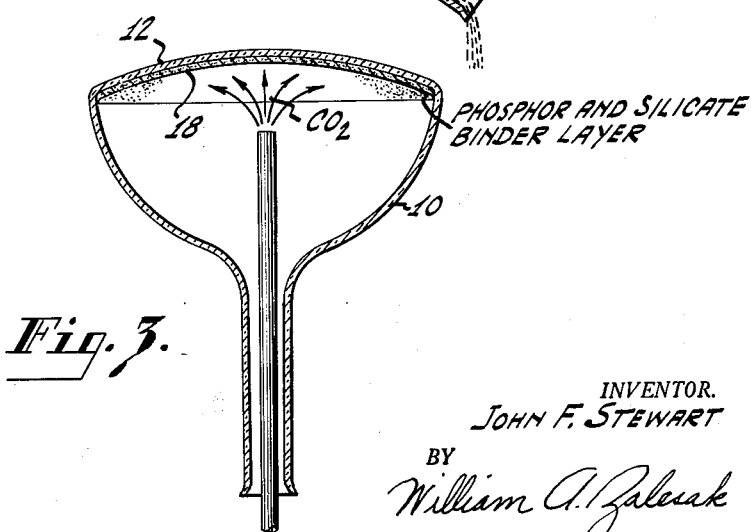
INVENTOR.
JOHN F. STEWART
BY
William A. Zalesak
ATTORNEY United States Patent Office 2,982,669
Patented May 2, 1961

2,982,669
METHOD OF MAKING A PHOSPHOR SCREEN AND SCREEN PRODUCED THEREBY

John F. Stewart, Marion, Ind., assignor to Radio Corporation of America, a corporation of Delaware Filed July 1, 1957, Ser. No. 668,994

10 Claims. (Cl. 117—33.5)

This invention relates to the art of making phosphor screens of the type comprising fine particles of phosphor material held together and secured to a support plate by a product of silicate gelation.

The objects of the invention are to provide an improved phosphor screen and method of making the same, the method being characterized by its economy and the screen being characterized by its strength and its improved adherence to its supporting base.

In brief, the method of the invention comprises forming on a supporting surface a phosphor screen. The screen may be formed in any suitable manner on the supporting surface and, wet with a silicate solution. The screen is then sprayed with carbon dioxide. The carbon dioxide reacts with the silicate of the wet screen to harden it and thereby to improve its strength and its adherence to its support plate.

The invention is described in greater detail in connection with the accompanying drawing wherein:

Figures 1 and 2 are sectional elevational views of a cathode ray tube in the process of having a phosphor screen formed on its face plate; and Figure 3 is a sectional elevational view of the same tube in which the phosphor screen is being treated according to the invention.

The method of the invention is described as it is employed in the framework of the settling process for making phosphor screens as described, for example, in U.S. Patent 2,328,292 of Painter, although this process is not limiting. In practicing the invention, a cathode ray tube bulb 10 is positioned with its face plate 12 downwardly and a quantity of a settling solution 14 is introduced into the bulb. A settling solution which may be used in making a phosphor screen in a tube bulb having a face plate diagonal of about 21 inches, includes 770 cc. of barium acetate electrolyte, 1145 cc. of potassium silicate binder and 18,000 cc. of distilled water. The settling solution is introduced into bulb 10 to form a pool 14. Next, an aqueous phosphor suspension 16 is sprayed gently onto the surface of the pool 14. For the size of tube mentioned, the phosphor suspension comprises about 6,875 gm. of a phosphor mixture of finely divided crystalline zinc sulphide and zinc cadmium sulphide suspended in about 275 cc. of water. The phosphor settles through the settling solution 14 and forms a layer 18 on the surface of the face plate 12. The settling solution may be then removed from the envelope.

One technique of removing the supernatant liquid from the tube bulb 10 is to decant or pour off the settling liquid as shown in Figure 2. This is after the phosphor has settled onto the surface of the face plate 12. During the pouring-off process, it is necessary that the wet adherence of the wet phosphor to the face plate surface be sufficiently great that no part of the phosphor layer 18 is displaced. The decanting is done at a speed which will not disturb the layer 18, as the liquid 14 falls away. If, however, the wet adherence of the phosphor layer 18 is not sufficient, certain defects in the screen will result. These are caused by the phosphor coating 18 slipping and resulting in slight ripples in the coating; or by a small part of the phosphor breaking away and rolling up as it falls across the coating 13.

The amount of barium acetate and potassium silicate used in the settling solution 14 is determined by what is necessary to provide sufficient wet adherence of the screen during pour-off. A reaction between the barium acetate and the potassium silicate occurs in the pool 14 before pour-off and results in the formation of a highly dispersed silica gel or gelation, which settles with the phosphor particles and helps to bind the phosphor to the supporting surface.

Normally, the phosphor screen is dried after pour-off, so that the silicate gelation remaining with the phosphor layer 18 is dehydrated and forms a cementing action to bind the dry phosphor to the face plate. The drying step provides sufficient dry adherence of the dry phosphor to the face plate, so that it will withstand subsequent processing. Such processing may include rewetting the screen 18 with water and spraying a lacquer film onto the wet phosphor layer. For this treatment the phosphor material should sufficiently adhere to the face plate, so that it will not be removed during this processing. If the dry adherence of the phosphor to the face plate 12 is not sufficient during the subsequent wetting and filming operations, the lacquer spray will form holes in the phosphor layer.

The above concentrations of barium acetate and potassium silicate used in the settling step are those which will provide an optimum dry adherence of the phosphor after formation of the screen. The proportion of silicate, however, in the solution is more than enough to supply the wet adherence required for the pouring-off operation. In fact, if the concentration of silicate were reduced in the settling solution it would provide a greater wet adherence, but insufficient gelation would occur to provide the necessary dry adherence of the phosphor, required for subsequent tube processing.

In accordance with the invention, after the settling solution 14 has been removed from bulb 10, the wet screen 18 is treated with carbon dioxide gas. This treatment is effected by blowing or spraying the gas under pressure onto the wet phosphor screen so that intimate contact of the gas with the wet screen is achieved. The effect of the carbon dioxide treatment is to harden the wet screen and greatly increase its adherence to the surface of face plate 12, without the necessity of thoroughly drying the screen.

The procedure according to the invention is schematically indicated in Figure 3. Carbon dioxide gas under pressure of about 30 pounds per square inch is suitable. About 0.85 cu. ft. of gas has been found sufficient to treat a 21″ size cathode ray tube having a screen weight of 3.5 miligrams per square centimeter of face place area. The carbon dioxide gas is played onto the screen 18 for about 15 seconds after which the screen is air dried for about 7½ minutes to complete its processing. The length of time of treatment, the pressure, and volume of the carbon dioxide are not critical and may be varied as required by the size of the screen.

One way to measure the adherence of a phosphor screen comprises directing a stream of water under pressure onto a dried and re-wetted screen. A hole is eroded in the screen and the diameter of the hole is considered to be inversely proportional to the adherence and is thus used as a measure of the adherence. The following table shows the adherence of screens formed in bulbs of the same size and settled from suspensions having different acetate and silicate concentrations when treated with carbon dioxide as compared to similar screens not treated with carbon dioxide:

| Settling Solution | Adherence | |
|---|---|---|
| | With $CO_2$ cm. | Without $CO_2$ cm. |
| 510 cc. acetate—360 cc. silicate | 3.25 | 9.1 |
| 510 cc. acetate—510 cc. silicate | 1.3 | 7.9 |
| 510 cc. acetate—700 cc. silicate | 0.7 | 6.6 |
| 400 cc. acetate—510 cc. silicate | 1.0 | 5.8 |

The present invention has the economic advantage that the silicate employed during screen formation may be reduced by more than half and yet provide the same adherence of the phosphor screen to the surface of the tube face plate. For example, where 1100 cc. of silicate was employed without the $CO_2$ treatment, 550 cc. is sufficient with the $CO_2$ treatment to provide a screen having greater adherence to the tube face plate.

The invention also may enable the filming of the wet phosphor screen immediately after pour-off and without thoroughly drying the screen, as previously required. This will result in a saving in time and processing between tube pour-off and the filming operation.

This invention has been described as that in which carbon dioxide is used to treat the wet phosphor screen after pour-off. It is believed that the reaction of the carbon dioxide with the water of the wet screen results in the formation of carbonic acid which reacts with the free silicate in the phosphor screen to immediately form additional gelation and to increase the adherence of the phosphor to the glass face plate. The carbonic acid probably also reacts with the product of silicate gelation in the screen to increase its gelation.

It is well within the scope of this invention to utilize other gaseous treatments of the wet phosphor screen, wherein such gases will also form an acid with the water of the screen which in turn will react with the free silicate to increase the gelation in the screen. For example, such gases may be sulphur dioxide, nitrous oxide, nitrogen dioxide, etc. However, due to the noxious nature of some of these gases their use may not be feasible.

The above described technique has been that in which a phosphor screen has been formed within a cathode ray tube envelope. The use of a cathode ray tube bulb is not in any way limiting, as the same process and techniques can be applied in forming a phosphor screen on any type of surface, such as on a flat glass plate, for example.

The above invention has been described as one using a settling solution formed from a mixture of potassium silicate and barium acetate. It is recognized that sodium silicate may be used in place of the potassium silicate and that other well known electrolytes may be substituted for the barium acetate. Electrolytes which have been used in the formation of phosphor screens include sodium sulfate, potassium sulfate, sodium acetate, sodium carbonate, etc. Many other electrolytes have also been used to provide a gelation product with the soluble silicate used in the settling solution. However, this invention utilizes a reaction between carbon dioxide and a silicate solution as well as probably the reaction between carbon dioxide and a product of silicate gelation.

The actual solutions through which the phosphor settles to form the screen are not too important, nor are the order in which they are mixed critical to this invention. The phosphor screen may also be formed by techniques other than by settling. These may be by spraying, flowing-on or slurrying. When the screen is wet with a soluble silicate and then treated with carbon dioxide, there will be an increase in the wet adherence of the screen.

What is claimed is:
1. The method of making a phosphor screen comprising the steps of forming a layer including a phosphor material and a silicate solution on a support plate for said screen and directing carbon dioxide gas at said layer.
2. A phosphor screen made according to the method of claim 1.
3. The method of making a phosphor screen comprising the steps of forming on a phosphor screen support a layer of a phosphor material wet with silicate solution and applying carbon dioxide gas under pressure to said layer.
4. The method of making a phosphor screen comprising the steps of, forming on a screen support a layer of phosphor material and a soluble silicate, and covering said layer with carbonic acid solution.
5. The method of making a phosphor screen comprising the steps of, depositing on a support for said phosphor screen a water-wet layer of a phosphor material and a soluble silicate, and applying carbon dioxide gas to said layer to harden it.
6. The method of making a phosphor screen comprising the steps of, forming on a phosphor screen support a wet layer of a phosphor material and a soluble silicate, exposing said layer to carbon dioxide gas to harden said layer, and then drying said layer.
7. The method of making a phosphor screen comprising the steps of, settling a phosphor material onto a phosphor screen support plate through an aqueous silicate solution, removing said solution from said support plate and leaving a water-wet layer of said phosphor and a product of silicate gelation on said support plate, and subjecting said wet layer to carbon dioxide gas to harden it.
8. The method of making a phosphor screen comprising the steps of, settling phosphor material onto a phosphor support plate through an aqueous solution of a soluble silicate and an electrolyte, removing said solution and leaving a water-wet layer of said phosphor and a product of silicate gelation on said support plate, and applying carbon dioxide gas to said layer to mix intimately therewith and to harden said layer.
9. The method of making a phosphor screen comprising the steps of, settling phosphor material onto a phosphor screen support surface through an aqueous solution of a soluble silicate selected from the group consisting of potassium silicate and sodium silicate and an electrolyte selected from the group consisting of sodium sulfate, potassium sulfate, sodium acetate, and barium acetate, removing said aqueous solution and leaving a water-wet layer of said phosphor material and a product of silicate gelation on said support surface, and applying carbon dioxide gas to said layer to form a reaction of said silicate gelation product with carbon dioxide.
10. The method of making a phosphor screen comprising the steps of, settling phosphor material onto a phosphor screen supporting surface through an aqueous solution of potassium silicate and barium acetate, removing said aqueous solution and leaving a water-wet layer of said phosphor material and potassium silicate on said support surface, and blowing carbon dioxide gas at said layer to form a reaction of said potassium silicate with carbon dioxide.

References Cited in the file of this patent

UNITED STATES PATENTS

| 682,140 | Friswell | Sept. 3, 1901 |
| 686,672 | Friswell | Nov. 12, 1901 |
| 1,874,974 | Hammenecker | Aug. 30, 1932 |
| 2,496,895 | Staley | Feb. 7, 1950 |
| 2,676,110 | Hesse | Apr. 20, 1954 |